United States Patent [19]
Lambert et al.

[11] Patent Number: 5,407,217
[45] Date of Patent: Apr. 18, 1995

[54] DETACHABLE SKI ASSEMBLY FOR CHILD'S PUSHCHAIR

[76] Inventors: Paul Lambert; Jeanine Lambert, both of 485, rue Victoria, Sherbrooke (Quebec), Canada, J1H 3J3

[21] Appl. No.: 206,715
[22] Filed: Mar. 7, 1994
[51] Int. Cl.$^6$ .................. B62B 13/18; B62B 19/02
[52] U.S. Cl. ............................ 280/10; 280/8; 280/47.38
[58] Field of Search ............ 280/7.1, 7.12, 7.13, 280/7.14, 8, 9, 10, 13, 47.38, 643, 648, 30; 24/136 R, 265 H, 370, 716, 907

[56] References Cited

U.S. PATENT DOCUMENTS

| 304,621 | 9/1884 | Deetz | 280/13 |
|---|---|---|---|
| 1,077,524 | 11/1913 | Gledhill | 280/13 |
| 1,128,698 | 2/1915 | Levy | 280/10 |
| 2,352,966 | 7/1944 | Morando | 280/8 |
| 2,443,699 | 6/1948 | Swain | 280/7.12 X |
| 4,479,657 | 10/1984 | Reynolds | 280/8 |
| 4,832,357 | 5/1989 | Crew | 280/13 X |

FOREIGN PATENT DOCUMENTS 138919  3/1912  Canada .
1167022 11/1958  France ......... 280/8
1643288  4/1991  U.S.S.R. ....... 280/8

Primary Examiner—Brian L. Johnson
Attorney, Agent, or Firm—Pierre Lespérance; Francois Martineau

[57] ABSTRACT

Each of the pair of elongated skis circumscribe a pair of upwardly facing wheel-engaging wells at opposite fore and aft ends thereof, for receiving and containing a pair of fore and aft registering wheels from both axles of a two axle pushchair. A pair of elongated elastic cables are each anchored at both ends thereof to front and rear portions of a corresponding ski intermediately of the wells thereof. A pair of hooks are each slidingly carried along a corresponding elastic cable and releasably interconnect the elastic cable to the pushchair frame in such a way that the corresponding ski is movable between a first, operative, ground-engaging position, in which each pair of fore and aft registering wheels engage a corresponding ski well and are biased thereagainst under the resiliency of the elastic cable, and an inoperative, ground-clearing position, in which the ski releases the corresponding registering fore and aft wheels and extend generally above the latter.

9 Claims, 5 Drawing Sheets

DETACHABLE SKI ASSEMBLY FOR CHILD'S PUSHCHAIR

FIELD OF THE INVENTION

This is invention relates to systems to simply and rapidly transform a child's wheeled pushchair into a sleigh for sliding engagement over snow-covered ground surfaces.

BACKGROUND OF THE INVENTION

Canadian patent No. 138,919 issued in 1911 to Alfred WESTMAN, William WESTMAN and James RICHARDS, discloses a system for installing a snow-going ski to the wheels on one side of a two axle vehicle. The ski 1 includes a front arcuate end c which is adapted to engage a substantial sector part of the front peripheral portion of the front wheel 2. The ski 1 is releasably anchored to the vehicle by an extensible coil spring 7, extending between and endwisely anchored to the hub of the rear axle and the intermediate ski section 5, whereby the arcuate front ski section c engaging the front wheel 2 prevents forward relative motion of the ski. Clearly, when the ski is removed by disengaging the spring 7, the ski becomes loose and must be stacked somewhere—an inconvenience.

OBJECTS OF THE INVENTION

The gist of the present invention is to provide a detachable runner for child's carriage, with the runner remaining inconspicuously attached to the carriage in both its operative and inoperative positions.

A corollary object of the invention is to provide such a retractable ski assembly for a child's pushchair, which will enable its pushing ahead rather than its pulling from abaft (as for a sleigh), thus enhancing the safety of operation of the vehicle in that the child will constantly remain in the line of sight of the adult maneuvering this pushchair.

SUMMARY OF THE INVENTION

In accordance with the objects of the invention, there is disclosed a ski assembly for use in releasably fitting a child's pushchair, said pushchair of the type including an open tubular frame supported by a two-axle wheelbase, said ski assembly comprising: (a) an elongated ski member, defining an underface, for sliding engagement over ground, and a top face, said top face circumscribing a pair of upwardly facing wheel-engaging wells at opposite fore and aft ends thereof for receiving and containing a pair of fore and aft registering wheels from the two axles; (b) an elongated resilient member, integrally projecting from said ski member; and (c) a hook member, for releasably interconnecting said resilient member to said pushchair frame in such a way that said ski member is movable between a first, operative, ground-engaging position, in which said pair of registering wheels engage said ski wells and are biased thereagainst under the resiliency of said resilient member, and an inoperative, ground-clearing position, in which said ski member releases said registering wheels and extend generally above the latter.

Preferably, said ski member further includes telescopic means, for adjustably varying its effective length to fit two-axle pushchairs of variable wheelbase.

Advantageously, said ski member top face further includes first and second wheel-abutment steps, located respectively at the front end of said fore well and at the rear end of said aft well, to prevent accidental wheel disengagement from said wells during acceleration/deceleration of said pushchair.

Profitably, said hook member is of generally arrow shape with a main stem, to which said resilient member is connected and from which transversely projects a first semi-circular flange and a second, cross-sectionally V-shape flange opposite said first flange, said first flange adapted to fit a tubular pushchair frame of cross-sectionally circular shape, while said second flange is adapted to fit a tubular pushchair frame of cross-sectionally quadrangular shape. Said ski member could then include a pair of fore and aft, countersunk through channels, located intermediately of said fore and aft wells, each said through-channel being fixedly engaged by a rigid, spring-loaded, hollow connector member, sized to fit therein; and said elongated resilient member consisting of an elastic cable engaging at opposite ends thereof the corresponding said through-channels, into the hollow of the respective said spring-loaded connector members where they are frictionally locked in releasable fashion under the spring bias of said connector members. Said ski member could further include telescopic means, for adjustably varying its effective length to fit two-axle pushchairs of variable wheelbase, and said hook member main stem includes a transverse, integral sleeve member at its free end opposite said flanges thereof, said sleeve member being freely slidingly engaged by said elastic cable for adjustment of the position of said hook member lengthwisely of said elastic cable, to enable pitch adjustment of said ski member upon varying the length of said ski member with said telescopic means, whereby said ski member may remain self,balanced in a substantially horizontal condition. Moreover, it would then be envisioned that each said connector member further carries a skate member integrally depending from the underface thereof, said skate members projecting from the corresponding said through-channels beyond said underface of the ski member for penetrating into hardened snow on the ground, said skate members for preventing accidental slide-slipping of the pushchair in the operative ground sliding mode of the ski assembly.

The invention also relates to a pushchair comprising in combination: (a) an open tubular frame, supported by a two-axle wheelbase defining at least one pair of laterally spaced front wheels and at least one pair of laterally spaced rear wheels; (b) a pair of elongated ski members, each ski member defining an underface, for sliding engagement over ground, and a top face, said top face of each ski member circumscribing a pair of upwardly facing wheel-engaging wells at opposite fore and aft ends thereof for receiving and containing a pair of fore and aft registering wheels from both said axles; (c) a pair of elongated elastic cables, each elastic cable being anchored at both ends thereof to front and rear portions of a corresponding said member intermediately of said wells thereof; and (d) a pair of hook members, each hook member slidingly carried along a corresponding said elastic cable and releasably interconnecting said elastic cable to said pushchair frame in such a way that the corresponding said ski member is movable between a first, operative, ground-engaging position, in which each said pair of fore and aft registering wheels engage a corresponding said ski well and are biased thereagainst under the resiliency of said elastic cable, and an inoperative, ground-clearing position, in which said ski member releases the corresponding said registering fore and aft wheels and extend generally above the latter.

Then, said pushchair open frame should preferably include a generally horizontal cross-bar, for engagement by the two faces of both said ski members; wherein, upon bringing said ski members to said inoperative positions thereof, each ski member is brought against the underface of said cross-bar, spacedly over ground, whereby an upper limit position of the ski members is defined. Moreover, the length of said elastic cables could advantageously be such that, under the resiliency of the corresponding said elastic cables, said ski members in their said inoperative position are forcibly biased to frictionally abut against said cross-bar, so that any fore and aft swinging motion of the inoperative ski members that would be induced by acceleration/deceleration of the ground rolling pushchair is thus prevented.

DETAILED DESCRIPTION OF THE DRAWINGS

Figure 1:
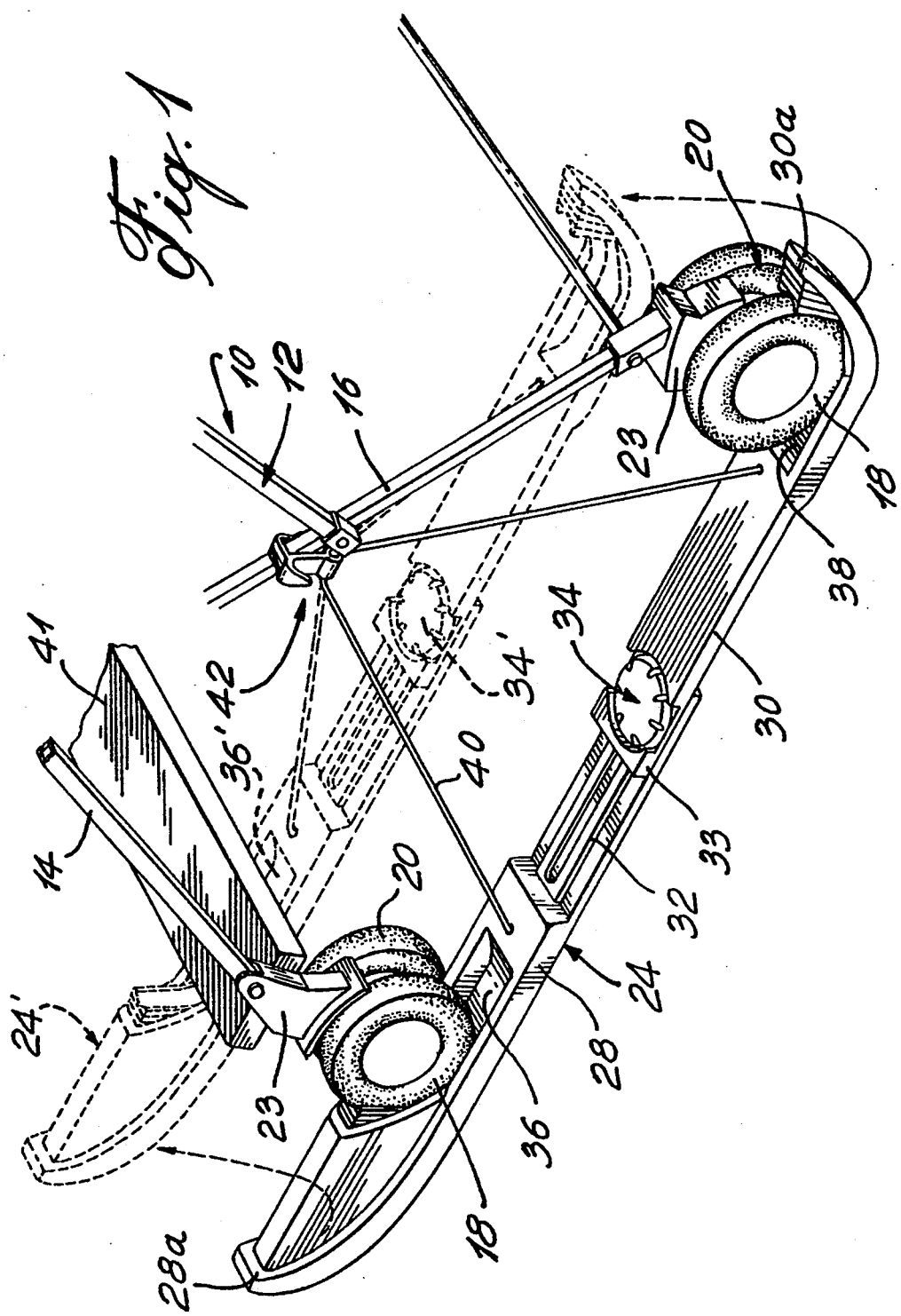
FIG. 1 is a partial isometric view of a child's pushchair, showing in full lines the detachable runner assembly in operative position, and in phantom lines the detachable runner assembly in inoperative position.

The child's push-chair 10 is of the conventional or umbrella type, including a main, open, tubular frame 12 supported over ground by a pair of laterally spaced front legs 14 and a pair of laterally spaced rear legs 16, each of these four legs carrying a pair of laterally spaced wheels 18, 20. Each pair of wheels 18 and 20 are interconnected by a fixed common axle 22, this fixed axle 22 being in part integral to the carriage main frame 12, via yoke members 23 at the bottom ends of legs 14 and 16. It is understood that legs 14 and 16 are not upright, as suggested in FIG. 1, but rather, are upwardly interiorly inclined to converge toward one another, and remain substantially within the plane intersecting the corresponding wheel axles 22.

Figure 3:
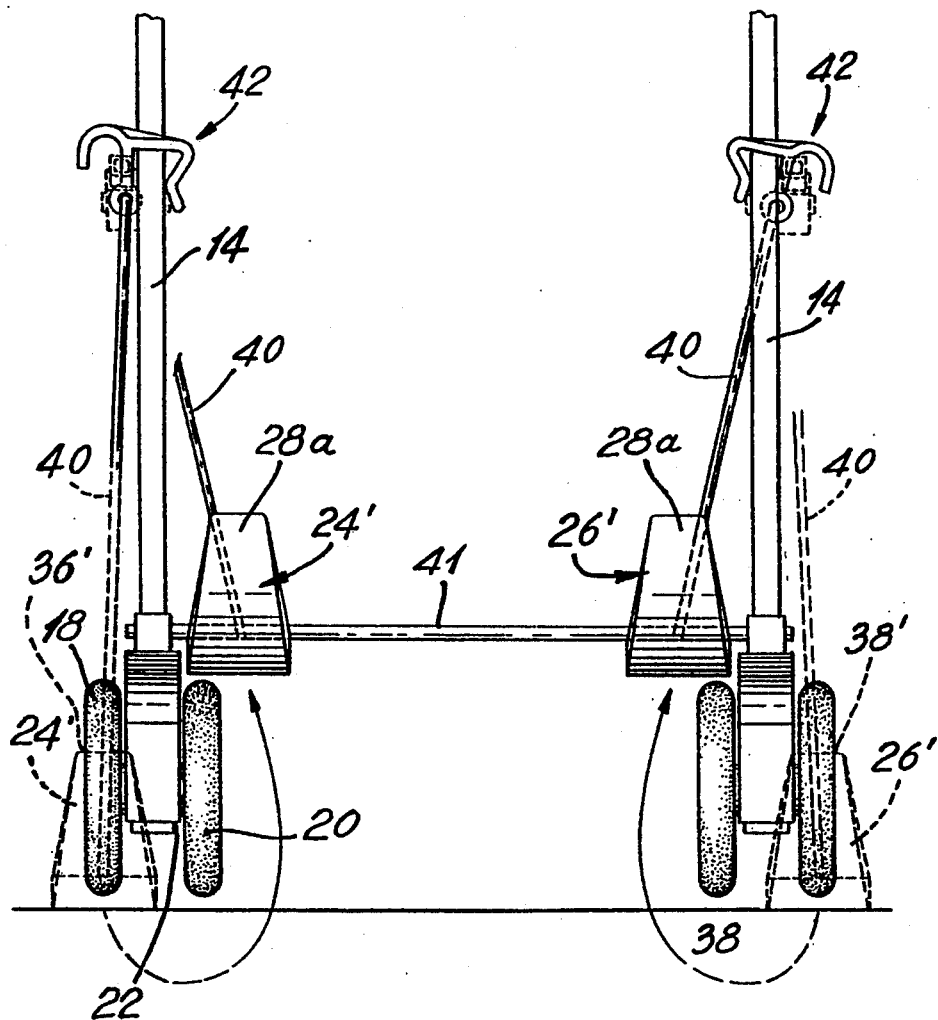
FIG. 3 is an end view of the child's push-chair, with the detachable runner assembly now being illustrated as in full lines at their inoperative position, and as in phantom lines in their operative position.

According to the invention, and as suggested in FIG. 3, there is provided a pair of telescopingly extendible runners or ski members, 24, 26: one for one lateral side of the carriage 10, and the other for the other lateral side thereof. Each ski, e.g. ski 24 in FIG. 1, defines a front and a rear, elongated, coextensive parts 28 and 30, which are interconnected by a slider joint means 32, 33, and interlocked by a releasable locking means 34. Locking means 34 maintains ski parts 28 and 30 coextensive, i.e. will prevent relative tilt (parts 28 and 30 will remain coplanar). Front ski part 28 includes an arcuately upturned free front end 28a, and rear ski part 30 includes an arcuately upturned free rear end 30a.

Upturned front ski tip 28a promotes forward ground motion of the ski 18, while upturned rear ski tip 30a promotes backward ground motion of the ski 18. However, the architecture of the ski, namely the greater distance between the front tip 28a and the front wheel well 36, relative to the shorter distance between the rear tip 30a and the rear wheel well 38, does favor frontward motion rather than rearward motion.

The top face of the front and of the rear parts 28, 30, of each ski further includes a recessed well, 36, 38, respectively, for receiving and containing a carriage wheel. The front side of the front well 36 and the rear side of the rear well 38 forms an upturned flange 36a, 38a, for constituting an abutment wall against which the respective wheel will be biased. Moreover, wells 36 and 38 will have a shape sized to receive pushchair wheels 18 of variable diameters.

As illustrated in FIG. 1, it is the laterally external wheels 18, 18, of the front and rear legs 14 and 16 on one side of the carriage, which are engaged into the recesses 36 and 38; this is preferred, although having the internal wheels 20 engage the recesses 36, 38, would not be excluded from the scope of the invention.

To an intermediate portion of each ski part 28 and 30 is anchored the corresponding opposite ends of an elongated elastic cable 40. A hook member 42 is slidingly carried along an intermediate section of this cable 40, for releasably engagement to a registering, non-vertically extending, tubular section of the main frame 12, e.g. an inclined leg 14 or 16, whereby a characteristic inversely V-shape arrangement is achieved relative to the ski member. This tubular section 14 or 16 should be interiorly offset relative to the corresponding side wheels 18 and 20. The length of this elastic cable 40 is such that, upon positioning the ski members 24 or 26 underneath the corresponding wheels 18 and 20 with the wheels 18 and 20 engaging the corresponding recesses 36 and 38, the elastic cable 40 is stretched so that the ski member is continuously biased against the underface of these wheels 18 or 20 (full lines in FIG. 1). This means that the wheel 18 frictionally engaging the corresponding ski recess is effectively prevented from idle rotation, as would be the case under inertial forces brought by acceleration and deceleration of the pushchair 10. Preventing accidental rotation of the wheel 18 is desirable, in view of limiting possibly destabilizing swinging motion of the whole vehicle 10 induced by such wheel rotation. Moreover, the advantage of providing a single wheel recess 36 or 38 is that it will be adaptable to pushchairs having a variable number of wheels per axles, e.g. a single one, or two (as illustrated) or three.

It is understood that, in view of adapting the fixed length elastic cable 40 to a variety of diffently sized pushchairs, it is envisioned that hook member 42 could be rotated a number of times to twist the intermediate section of the elastic cable 40, before the hook member 42 is hooked to the pushchair frame 16. Such cable twisting will of course progressively decrease the apparent length of the cable 40, thus enabling a long cable 40 to fit smaller frame pushchairs 12. Additionally, the relative position of the hook 42 can be changed to fit one or the other of the tubular frame sections which constitute the pushchair frame 12, to make sure that the ski 18 is well positioned—i.e., with its center of gravity being well balanced—relative to the pushchair frame 12, particularly at the upper limit position of the ski.

It is important that the wheel containing recess 36 of the front ski part 28 be at a distance from the upturned, arcuate tip 28a (i.e. the leading edge) of this front ski part 28, otherwise the ski-mounted vehicle 10 could be prone to overturn frontwardly upon the ski hitting a ground obstacle. This is because a large fraction of the weight of the vehicle and is load (the infant) is carried by each front wheel, e.g. 20 to 25% each front wheel, and this 10ad does tend to somewhat induce the front ski tip 28a to sink relative to the ski aft end 30a, as is readily understood by those skilled in the art.

On the other hand, the ski members 24 or 26 can be forcibly released from the wheels 18 and 20. This can be done by lifting the corresponding side of the carriage 10 to clear ski members 24 or 26 from the ground, and by thereafter manually pushing the ski member away from the wheels 18 and 20; upon laterally interiorly shifting the ski member relative to the corresponding wheels 18 and 20, the offset ski member can then be allowed to raise over the level of! these wheels, yieldingly to the resiliency of the elastic cable 40,i up to a raised "inoperative" position illustrated as 24', 26', in phantom lines in FIG. 1 and in full lines in FIG. 3. In their inoperative condition, the reference numerals of those elements appearing on the figures have been primed, for better understanding of the reader. In this inoperative position of the ski member 24 or 26, the ski member may simply hang freely from the elastic cable 40, above the level of wheels 18 and 20; or alternately, and as suggested in FIG. 3, the ski members may, still under the bias of the elastic cable resiliency, abut against the underface of a horizontal cross-bar 41 forming an integral part of the vehicle open frame 12, in still partly stretched condition.

Thus, in the operative ski member position, both ski members 24 and 26 slidingly engage ground, for use particularly on snow-covered surfaces in sub-freezing environments. Alternately, in the inoperative ski member position, both ski members 24 and 26 clear ground so that the four pairs of wheels 18 and 20 rollingly engage ground, for use particularly indoor shopping malls and the like dry, warm environments. It is understood that there are two elastic cables 40, 40, i.e. one on each lateral side of the child's pushchair 10.

Preferably, the front ski part recess 36 will be farthest from the arcuate front ski tip 28a than the rear ski part recess 38 relative to the arcuate rear ski tip 30a, to provide enhanced control of the child's carriage 10 during forward ski motion on snowy surfaces. Moreover, the above-noted upright stopper walls 36a, 38a, against which the wheels 18 will abut, further promote stability of the vehicle in,the ski-fitted mode.

Figure 2:
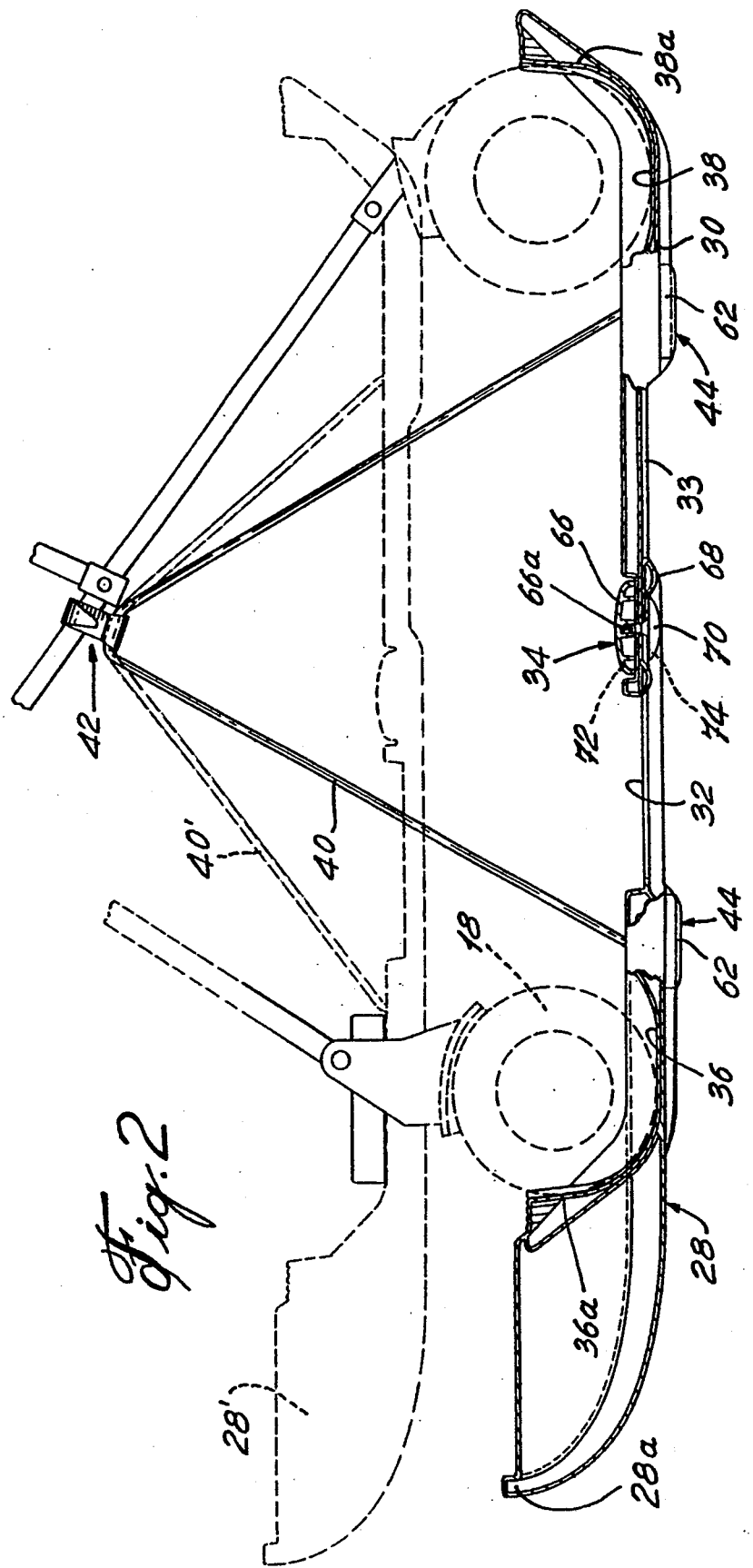
FIG. 2 is a sectional View of the runner elements and associated elastic cable of FIG. 1.

Preferably, and as illustrated in FIG. 2, there is further provided to the intermediate underface of each front and rear ski parts 28 and 30 a projecting skate member 44 (detailed below), to prevent accidental side slipping over hard snow ground surfaces in the operative mode of the ski members.

Figure 7:
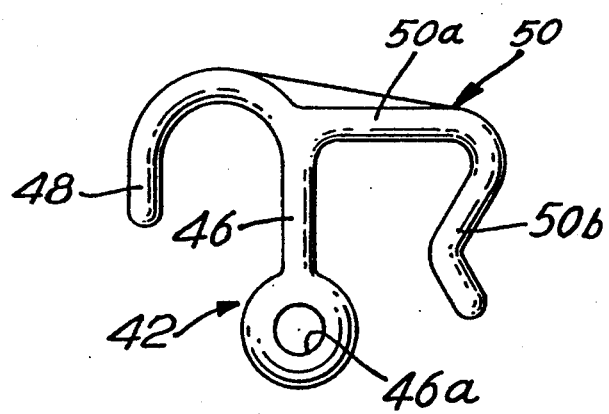
FIG. 7 is a plan view of the hook member adapted to be slidingly mounted to the elastic cable.

As suggested in FIG. 7, the hook member 42 forms a generally T-shape, including three legs 46, 48 and 50. An integral sleeve part 46a is carried at the end of the first leg 46, for free sliding engagement by the elastic cable 40. The second leg 48 is arcuately shaped, extending transversely from the main leg 46 to form an approximately semi-circular hooking surface. The third leg 50 includes an inner straight segment 50a, extending orthogonally from the main leg 46, and carrying at its outer end an inturned V-shaped flange 50b extending transversely of segment 50a, whereby an approximately V-shape hooking surface is formed by segment 50a and the inner part of V flange 50b.

As illustrated at the right hand side of FIG. 7, the V-shape flange 50b of hook member 42 preferably carries at its outer end a transverse, outturned lip; said lip preventing accidental disengagement of the hook 42 from the pushchair frame 16 when a quadrangular frame tube is engaged by the V-flange 50b.

It is understood that one or the other hooking surfaces 48 or 50 is selected for mating hooking engagement with the tubular frame part 14 or 16 of the vehicle frame 10, depending upon the cross-sectional shape of this selected tubular frame part: the semi-circular hooking surface 48 would best fit against a tubular frame part of cross-sectionally circular shape, while the V-shape hooking surface 50 would best fit against a tubular frame part of cross-sectionally quadrangular shape.

Figure 4:
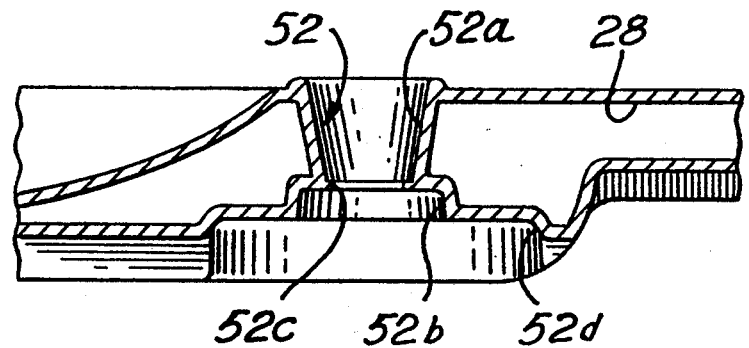
FIG. 4 is an enlarged cross-sectional view of the intermediate section of the front ski part, showing the countersunk bore into which is to be releasably attached the cable securing skate member.
Figure 5:
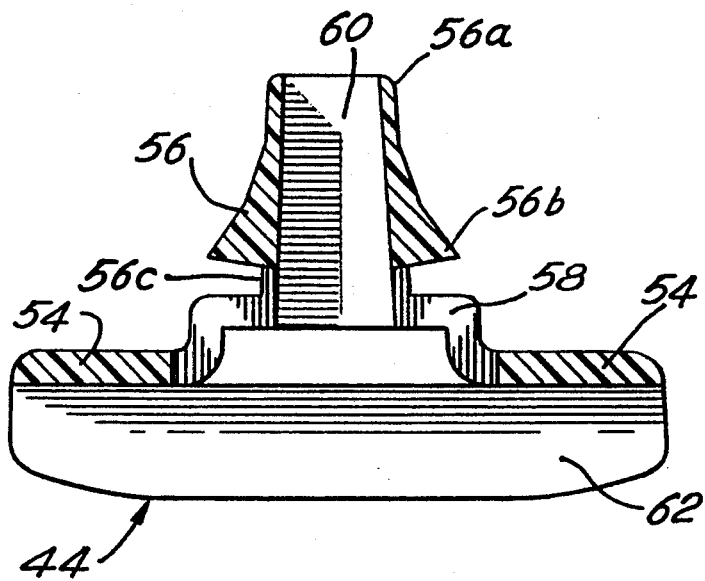
FIG. 5 is a cross-sectional view of the skate member adapted to fit inside the countersunk bore of FIG. 4.

Skate member 44 is illustrated in cross-section in FIG. 5, and is adapted to releasably engage into the countersunk bore 52, 52, (FIG. 4) made intermediately of and through each ski part 28, 30, respectively. Accordingly, skate member 44 includes a main annular body 54, from which transversely projects a hollow shaft 56 radially inwardly therefrom; the body 54 and shaft 56 being axially spaced by an elbowed step 58. The hollow shaft 56 is made from a soft, resilient material, which is of increasing thickness from its outer free end 56a to its intermediate section 56b; this intermediate section 56b being axially spaced from the elbowed step 58 by an inner shaft section 56c of diametrally smaller external diameter. The hollow shaft 56 defines an axial channel 60 with a diameter slightly increasing from outer end 56a to intermediate section 56b. Channel 60 extends freely through the skate member 44. One or more laterally spaced blades 62 are integrally formed on the underface of main body 54 (i.e. opposite the shaft 56), extending longitudinally of the ski lengthwise axis. Blades 62 are made from a sturdy, rigid material, capable of effectively biting into hardened snow on the ground, under the weight bias of the combined pushchair and infant load.

The ski countersunk bore 52 is accordingly sized to accommodate and retain in position the skate member 44. More particularly, bore 52 includes an upper funnel shape section 52a, opening into a diametrally larger intermediate annular cavity 52b via a radially inturned lip 52c; intermediate cavity 52 opens to the underface of the front ski part 28 via a still diametrally larger annular cavity 52d.

Figure 6:
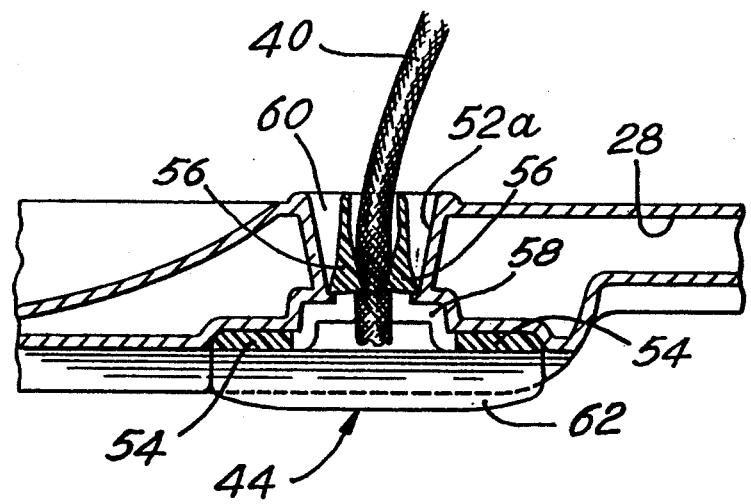
FIG. 6 is a view similar to that of FIG. 4, but with the skate member of FIG. 5 being operatively engaged into the countersunk bore and with the elastic cable anchored in place.

It can now be understood from FIG. 6 that soft shaft part 56 is deformingly engageable into funnel channel part 52a, with the diametrally largest end thereof 56b flatly abutting against the radially inturned ring 52c. The connector step 58 flatly engages into the annular cavity 52b, while the annular main body 54 engages into the lower annular cavity 52d of countersunk bore 52. Rigid blades 62 project downwardly beyond the plane of the ski underface, so as to be able to sink into snow and/or ice below ground level for expressing biting action thereon. Cable 40 is engageable through channel 60, starting with the channel top inlet port 56a toward and through connector sections 56b and 56c, to escape downwardly beyond the plane of main annular body 54 and in between the lengthwise blades 62 rearwardly thereof (only for a short end segment, if necessary).

It is understood that, due to the soft, resilient nature of shaft member 56, to its progressively increasing inner diameter from end 56'a to section 56b, and to its progressively increasing radial thickness from end 56a to section 56b, the cable 40 will be readily engageable therein (in the 56a to 56b direction) but will not be easily retractable therefrom. In other words, once each of the two ends of cable 40 is engaged through ski parts 28 and 30 (i.e. into theirs sockets 56), they will firmly hold in place against accidental release so that upon stretching the elastic cable 40 (as in FIG. 1), cable 40 will remain anchored at both ends to the ski 24.

As suggested in FIGS. 1 and 2, the ski part connector means 32, 33, consists in providing a railing along the top face of the inner section of front ski part 28, and a mating railing along the underface of the inner section of the rear ski part 30, whereby these railings are slidingly engaged into one another for sliding motion lengthwisely of the ski. The front and rear ski parts 28 and 30 are releasably anchored at a selected section of their sliding portions 32, 33, by a pair of discoid plates 66, 68, which plates are interconnected by a bolt 70. Bolt 70 extends through a selected pair of registering bores 72, 74 from a set of lengthwisely spaced bores made into ski parts 28 and 30, and threadedly into a threaded cavity 66a made in top discoid plate 66. Hence, the skis 24, 26, can be extended or retracted to fit pushchairs of varying dimensions, whereby the wheels 18 always remain within their respective wells 36 and 38 in the skis.

The ski members 24, 26 are preferably made from a plastic material, e.g. polyethylene; in any event, they should be made from a waterproof, lightweight material having a smooth surface (since being attached to a child's pushchair, it should not be a source of injury for the infant).

I claim:

1. A ski assembly for us in releasably fitting a child's pushchair, said pushchair including an open tubular frame supported by a two-axle wheelbase, said ski assembly comprising:

(a) an elongated ski member, defining an underface, for sliding engagement over ground, and a top face, said top face circumscribing a pair of upwardly facing wheel-engaging wells at opposite fore and aft ends thereof for receiving and containing a pair of fore and aft registering wheels from the two axles, said top face further including first and second wheel-abutment steps, located respectively at the front end of said fore well and at the rear end of said aft well, to prevent accidental wheel disengagement from said wells during acceleration/deceleration of said pushchair;

(b) an elongated resilient member, integrally projecting from said ski member;

(c) a hook member, for releasably interconnecting said resilient member to said pushchair frame in such a way that said ski member is movable between a first, operative, ground-engage position, in which said pair of registering wheels engage said ski wells and are biased thereagainst under the resiliency of said resilient member, and an inoperative, ground-cleaning position, in which said ski member releases said registering wheels and extend generally above the wheels and (d) telescopic means, for adjustably varying the effective length to fit two-axle pushchairs of variable wheelbase; wherein said hook member is of generally arrow shape with a main stem, to which said resilient member is connected and from which transversely projects a first semi-circular flange and a second, cross-sectionally V-shape flange opposite said first flange, said first flange adapted to fit a tubular pushchair frame of cross-sectionally circular shape, while said second flange is adapted to fit a tubular pushchair frame of cross-sectionally quadrangular shape.

2. A ski assembly as defined in claim 1, wherein said ski member includes a pair of fore and aft, countersunk through channels located intermediately of said fore and aft wells, each said through-channel being fixedly engaged by a rigid, spring-loaded, hollow connector member, sized to fit therein; and said elongated resilient member consisting of an elastic cable engaging at opposite ends thereof the corresponding said through-channels, into the hollow of the respective said spring-loaded connector members where they are frictionally locked in releasable fashion under the spring bias of said connector members.

3. A ski assembly as defined in claim 2, wherein said ski member further includes telescopic means, for adjustably varying the effective length to fit two-axle pushchairs of variable wheelbase, and said hook member main stem includes a transverse, integral sleeve member at a free end opposite said flanges thereof, said sleeve member being freely slidingly engaged by said elastic cable for adjustment of the position of said hook member lengthwisely of said elastic cable, to enable pitch adjustment of said ski member upon varying the length of said ski member with said telescopic means, whereby said ski member may remain self-balanced in a substantially horizontal condition.

4. A ski assembly as defined in claim 2, wherein each said connector member further carries a skate member integrally depending from the underface thereof, said skate members projecting from the corresponding said through-channels beyond said underface of the ski member for penetrating into hardened snow on the ground, said skate members for preventing accidental slide-slipping of the pushchair in the operative ground sliding mode of the ski assembly.

5. A child's stroller for alternate use over dry ground and over snowy terrain, comprising:

(a) an open tubular rigid frame, including two pairs of laterally opposite fore and aft legs, cross-members joining said laterally opposite legs, and ground-engageable wheels, rotatably mounted to each said frame leg, said cross-members extending spacedly above said wheels;

(b) a pair of elongated runner members, each defining a pair of opposite front and rear wheel support surfaces for releasably supporting the front and rear wheels respectively of one of opposite fore and aft legs thereof;

(c) a pair of elongated elastic members, each defining first and second ends;

(d) anchoring means, for anchoring each said first and second ends of a first elastic member to front and rear anchoring points of one said runner member and each said first and second ends of a second elastic member to front and rear anchoring points of the other said runner member, with said front and rear anchoring points being adjacent corresponding said front and rear wheel support surfaces respectively and being located between the corresponding front and rear wheels; and (e) a pair of hook members, each mounted to an intermediate section of a corresponding elongated elastic member and releasably engaged to an upper frame part of said stroller frame, with said upper frame part being spacedly above said cross-members of the stroller frame and generally overhanging the corresponding said runner member, whereby the runner member is continuously biased upwardly.

wherein each said runner member is movable between a first, operative, ground-engaging position, in which said runner member front and rear support surfaces are biased by said elastic member for abutting against and to support said front and rear wheels respectively, and a second inoperative, ground-clearing position, in which said elongated runner member is both laterally and upwardly offset from the first operative position such that said front and rear support surfaces are oriented upwardly and is biased by said elastic member to be maintained against said cross-members.

6. A runner assembly as in claim 5, wherein said hook members are mounted slidably along said elastic members.

7. A runner assembly for use over snowy grounds with a child's stroller, the stroller including an open rigid frame having two pairs of laterally opposite fore and aft legs with each leg carrying a ground-engageable rotatable wheel, said runner assembly comprising:

(a) an elongated runner member, defining a pair of opposite front and rear wheel support surfaces for releasably supporting the front and rear wheels respectively of one said pair thereof;

(b) an elongated elastic member, defining first and second ends;

(c) anchoring means, for anchoring each said first and second ends of the elastic member to front and rear anchoring points of said runner member, said front and rear anchoring points being adjacent said front and rear wheel support surfaces respectively and being located therebetween; and (d) a hook member, being engaged to an intermediate section of said elongated elastic member and adapted to engage an upper frame part of said stroller frame which generally overhangs said runner member, whereby the runner member is continuously biased upwardly;

wherein said runner member is movable between a first ground-engaging operative position, in which said runner member front and rear support surfaces are biased by said elastic member for abutting against and to support said front and rear wheels respectively, and a second ground-clearing inoperative position, in which said elongated runner member is both laterally and upwardly offset from the first operative position such that said front and rear wheel support surfaces are oriented upwardly, whereby said runner member maintains a stable ground-clearing position.

8. A runner assembly as defined in claim 7, wherein said runner member includes:

(a) a front half runner element;

(b) a rear half runner element;

(c) slider joint means, for guiding axial relative displacement of said front and rear runner elements; and (d) lock means, releasably interlocking said front and rear runner elements at a selected relative position along said slider joint means; whereby said runner member is telescopically extensible without compromising a parallel relative orientation of said runner member between said operative and said inoperative positions thereof.

9. A runner assembly as in claim 7, wherein said hook member is mounted slidably along said elastic member.

* * * * *